United States Patent
Farina

(10) Patent No.: US 9,540,029 B1
(45) Date of Patent: Jan. 10, 2017

(54) COOLER SLED DEVICE

(71) Applicant: Anthony Farina, Amityville, NY (US)

(72) Inventor: Anthony Farina, Amityville, NY (US)

(*) Notice: Subject to any disclaimer, the term of this patent is extended or adjusted under 35 U.S.C. 154(b) by 0 days.

(21) Appl. No.: 14/743,282

(22) Filed: Jun. 18, 2015

(51) Int. Cl.
*B62B 19/00* (2006.01)
*B62B 13/18* (2006.01)

(52) U.S. Cl.
CPC ..................... *B62B 13/18* (2013.01)

(58) Field of Classification Search
CPC ......... A61G 1/007; B62B 17/00; B62B 17/06; B62B 19/00; B62B 19/02
See application file for complete search history.

(56) References Cited

U.S. PATENT DOCUMENTS

| | | | |
|---|---|---|---|
| 5,480,170 A | 1/1996 | Kaiser, II | |
| 5,941,540 A * | 8/1999 | O'Haire | A63C 5/03 280/18 |
| 6,042,122 A | 3/2000 | Mohr | |
| 6,474,097 B2 | 11/2002 | Treppedi et al. | |
| D480,276 S | 10/2003 | Duart et al. | |
| 8,256,156 B1 | 9/2012 | Burgoyne, Jr. | |
| 2009/0236380 A1* | 9/2009 | Adkins | A61G 1/04 224/161 |

* cited by examiner

*Primary Examiner* — Erez Gurari

(57) ABSTRACT

A cooler sled device for facilitating transport of a cooler over surfaces such as gravel, loose terrain, and sand includes a panel. A bottom surface of the panel is convexly curved between outer sides of a perimeter edge of the panel and extending rearwardly from a front side of the perimeter edge defining an upwardly turned front section of the bottom surface. Each of a pair of wells is positioned on an upper surface of the panel and proximate a respective one of the outer sides of the perimeter edge for receiving wheels coupled to a cooler positioned on the panel. A strap is positionable to extends across the upper surface of the panel for securing the cooler on the panel.

9 Claims, 6 Drawing Sheets

COOLER SLED DEVICE

BACKGROUND OF THE DISCLOSURE

Field of the Disclosure

The disclosure relates to sled devices and more particularly pertains to a new sled device for facilitating transport of a cooler over surfaces such as gravel, loose terrain, and sand.

SUMMARY OF THE DISCLOSURE

An embodiment of the disclosure meets the needs presented above by generally comprising a panel. A bottom surface of the panel is convexly curved between outer sides of a perimeter edge of the panel and extending rearwardly from a front side of the perimeter edge defining an upwardly turned front section of the bottom surface. Each of a pair of wells is positioned on an upper surface of the panel and proximate a respective one of the outer sides of the perimeter edge for receiving wheels coupled to a cooler positioned on the panel. A strap is positionable to extends across the upper surface of the panel for securing the cooler on the panel.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
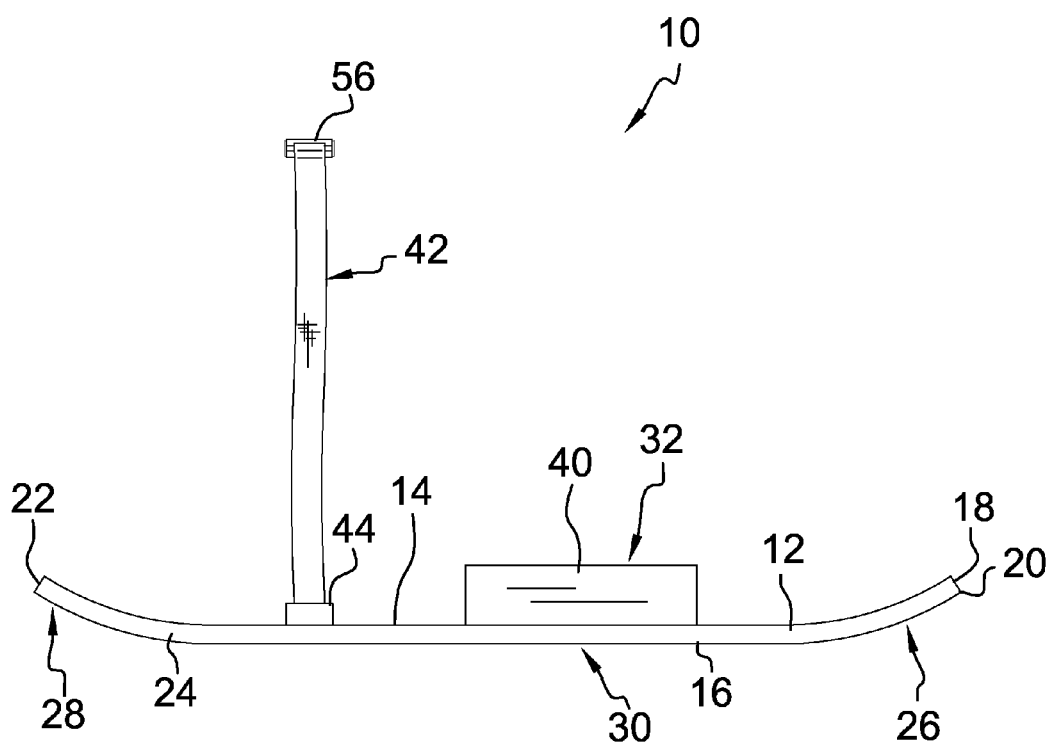
FIG. 1 is a side view of a cooler sled device according to an embodiment of the disclosure.
Figure 2:
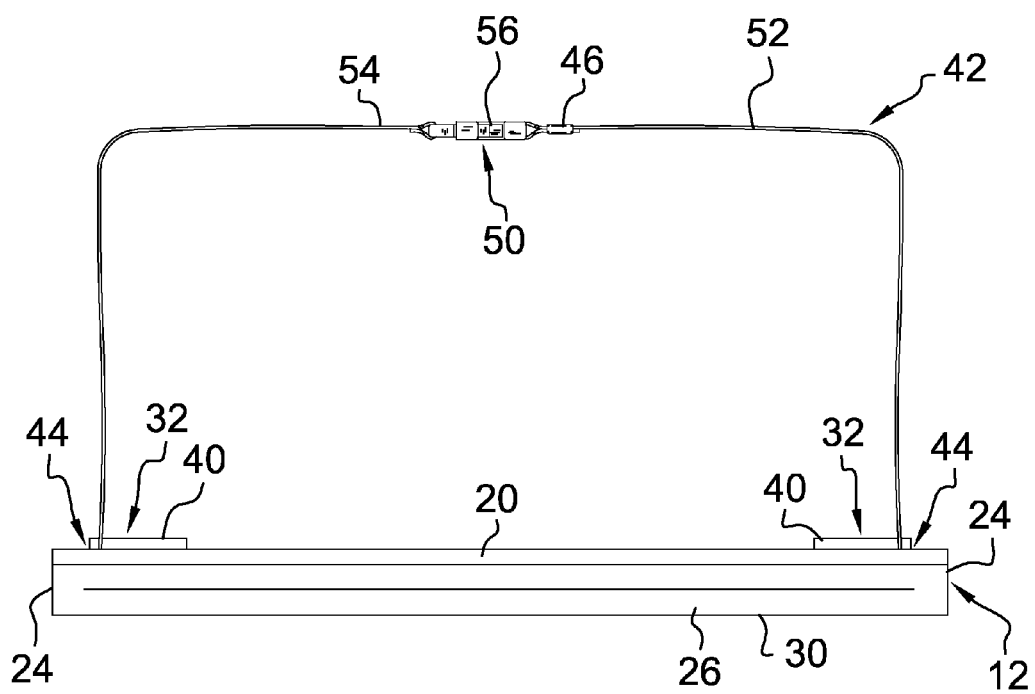
FIG. 2 is a front view of an embodiment of the disclosure.
Figure 3:
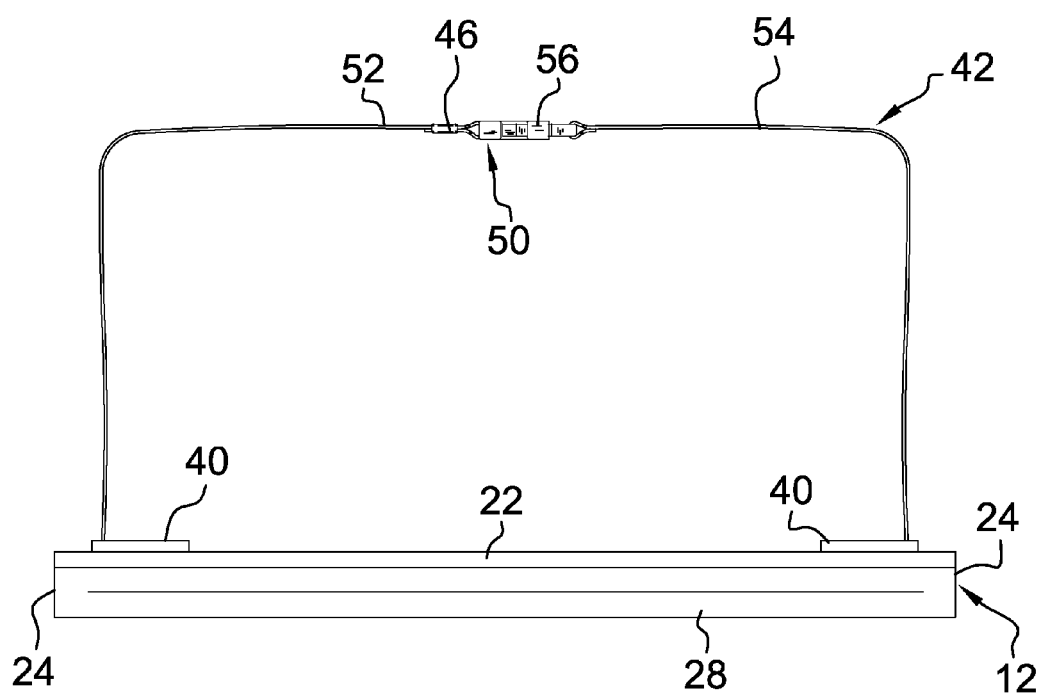
FIG. 3 is a rear view of an embodiment of the disclosure.
Figure 4:
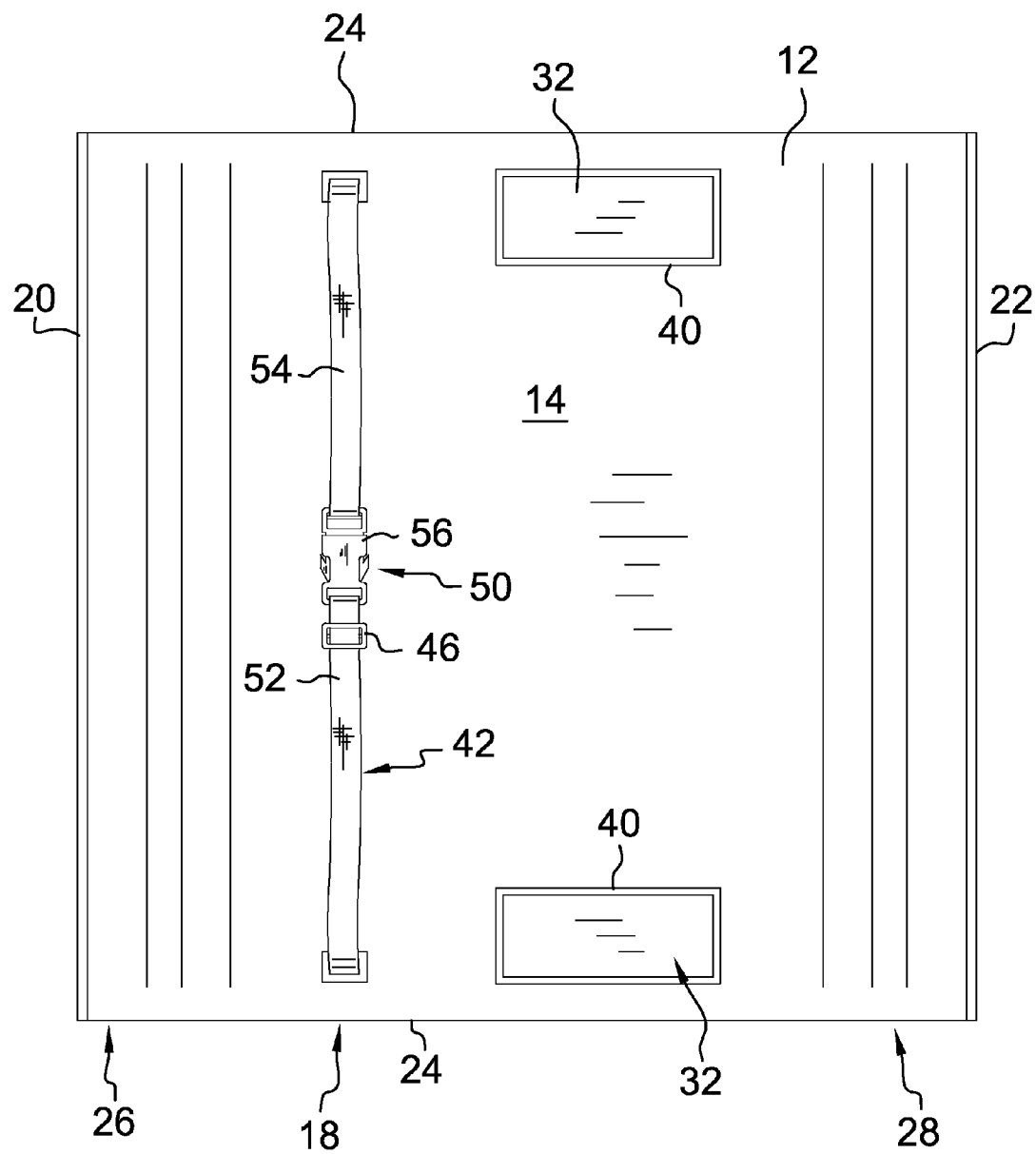
FIG. 4 is a top view of an embodiment of the disclosure.
Figure 5:
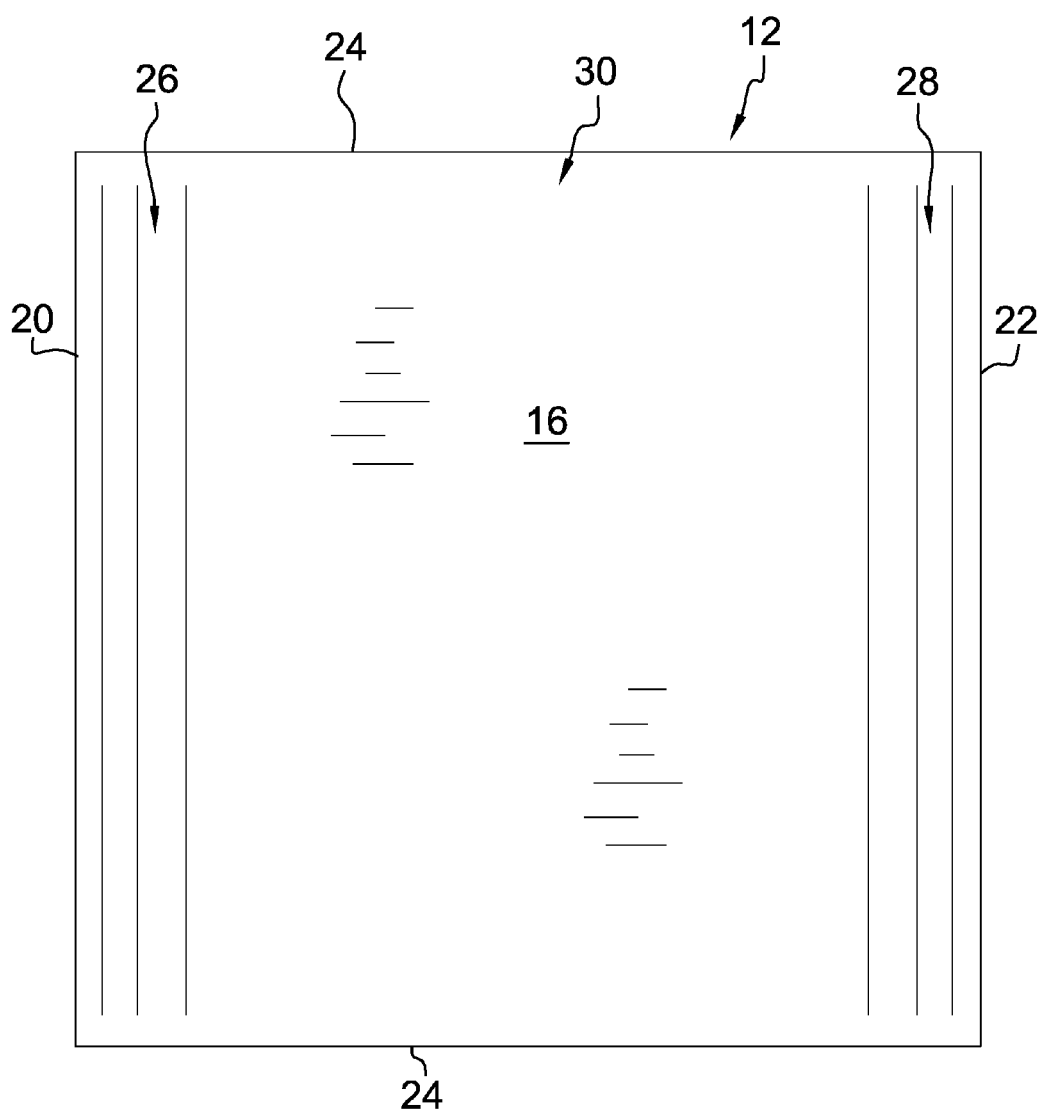
FIG. 5 is a bottom view of an embodiment of the disclosure.
Figure 6:
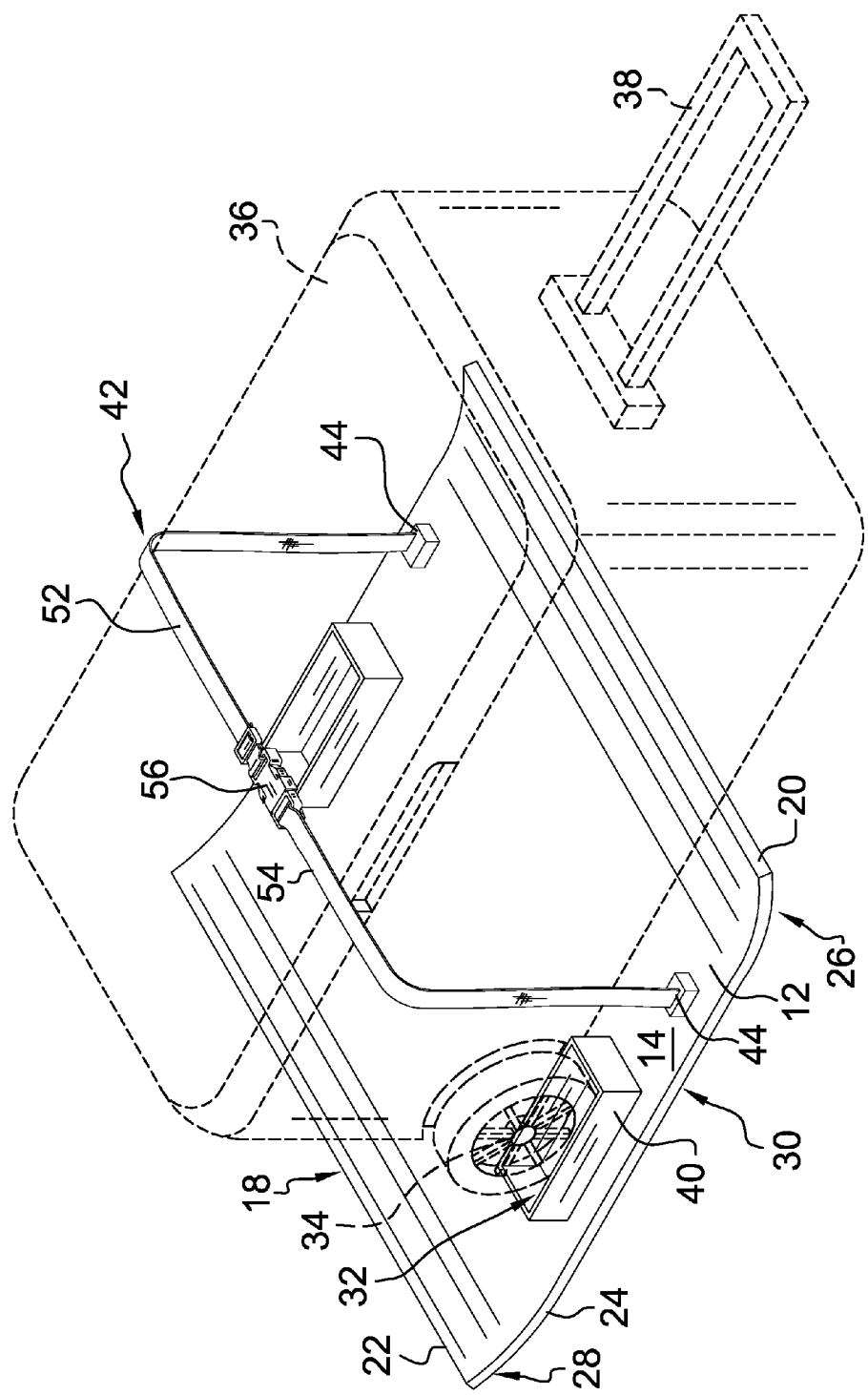
FIG. 6 is a top front side perspective view of an embodiment of the disclosure in use.

With reference now to the drawings, and in particular to FIGS. 1 through 6 thereof, a new sled device embodying the principles and concepts of an embodiment of the disclosure and generally designated by the reference numeral 10 will be described.

As best illustrated in FIGS. 1 through 6, the cooler sled device 10 generally comprises a panel 12 having an upper surface 14, a bottom surface 16, and a perimeter edge 18 extending around and between the upper surface 14 and the bottom surface 16. The perimeter edge 18 has a front side 20, a back side 22, and a pair of outer sides 24. The bottom surface 16 is convexly curved between the outer sides 24 of the perimeter edge 18 and extending rearwardly from the front side 20 of the perimeter edge 18 defining an upwardly turned front section 26 of the bottom surface 16. The bottom surface 16 of the panel 12 is also convexly curved between the outer sides 24 of the perimeter edge 18 and extending forwardly from the back side 22 of the perimeter edge 18 defining an upwardly turned rear section 28 of the bottom surface 16. The bottom surface 16 has a medial section 30 extending between the upwardly turned front section 26 and the upwardly turned rear section 28. The medial section 30 is planar. The panel 12 has a constant thickness between the upper surface 14 and the bottom surface 16. The upwardly turned front section 26 and the upwardly turned rear section 28 may be similarly shaped such that the bottom surface 16 is symmetrical with respective to a center line extending between the outer sides 24 of the perimeter edge 18.

Each of a pair of wells 32 is positioned on the upper surface 14 of the panel 12. Each of the wells 32 is positioned proximate a respective one of the outer sides 24 of the perimeter edge 18 such that the wells 32 are configured for receiving wheels 34 coupled to a cooler 36 positioned on the panel 12. The cooler 36 may be of the type having an extendable handle 38. The panel 12 has a length extending forwardly from the wells 32 such that the cooler 36 extends over the front side 20 of the perimeter edge 18 when the cooler 36 is positioned on the panel 12 with the wheels 34 being positioned in the wells 32. Each of the wells 32 is defined by a respective rectangular wall 40 extending upwardly from the upper surface 14 of the panel 12.

A strap 42 has opposite ends 44 coupled to the panel 12. The strap 42 has an adjustable length in a conventional manner using a slidable buckle 46 or the like. The strap 42 is positionable to extend over the cooler 36 across the upper surface 14 of the panel 12 such that the strap 42 is configured for securing the cooler 36 on the panel 12. Each of the opposite ends 44 of the strap 42 is coupled to the upper surface 14 of the panel 12 in linear alignment with an outer lateral side 48 of a respective one of the walls 40. The strap 42 has a break 50 therein defining a first section 52 and a second section 54 of the strap 42. A connector 56 is coupled to the strap 42. The connector 56 may have two interlocking portions of conventional construction for releasably coupling the first section 52 of the strap 42 to the second section 54 of the strap 42.

In use, the cooler 36 is positioned on the panel 12 with the wheels 34 sitting in the wells 32. The strap 42 is fastened around the cooler 36 to secure the panel 12 to the cooler 36. The extendable handle 38 of the cooler 36 is extended allowing a user to hold and drag the cooler 36 on the panel 12.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A cooler sled device comprising:
 a panel having an upper surface, a bottom surface, and a perimeter edge extending around and between said upper surface and said bottom surface, said perimeter edge having a front side, a back side, and a pair of straight outer sides, said bottom surface being convexly curved between said straight outer sides of said perimeter edge and extending rearwardly from said front side of said perimeter edge defining an upwardly turned front section of said bottom surface;
 a pair of wells positioned on said upper surface of said panel, each of said wells being positioned proximate a respective one of said straight outer sides of said perimeter edge wherein said wells are configured for receiving wheels coupled to a cooler positioned on said panel; and
 a strap having opposite ends coupled to said panel, said strap being positionable to extends across said upper surface of said panel such that said strap is configured for securing the cooler on the panel.

2. The device of claim 1, further comprising each of said wells being defined by a respective rectangular wall extending upwardly from said upper surface of said panel.

3. The device of claim 1, further comprising said bottom surface of said panel being convexly curved between said outer sides of said perimeter edge and extending forwardly from said back side of said perimeter edge defining an upwardly turned rear section of said bottom surface.

4. The device of claim 3, further comprising said bottom surface having a medial section extending between said upwardly turned front section and said upwardly turned rear section, said medial section being planar.

5. The device of claim 4, further comprising said panel having a constant thickness between said upper surface and said bottom surface.

6. The device of claim 1, further comprising:
 said strap having a break defining a first section and a second section of said strap; and
 a connector coupled to said strap, said connector releasably coupling said first section of said strap to said second section of said strap.

7. The device of claim 1, further comprising said strap having an adjustable length.

8. The device of claim 1, further comprising each of said opposite ends of said strap being coupled to said upper surface of said panel in linear alignment with an outer lateral side of a respective one of said walls.

9. A cooler sled device comprising:
 a panel having an upper surface, a bottom surface, and a perimeter edge extending around and between said upper surface and said bottom surface, said perimeter edge having a front side, a back side, and a pair of straight outer sides, said bottom surface being convexly curved between said straight outer sides of said perimeter edge and extending rearwardly from said front side of said perimeter edge defining an upwardly turned front section of said bottom surface, said bottom surface of said panel being convexly curved between said straight outer sides of said perimeter edge and extending forwardly from said back side of said perimeter edge defining an upwardly turned rear section of said bottom surface, said bottom surface having a medial section extending between said upwardly turned front section and said upwardly turned rear section, said medial section being planar, said panel having a constant thickness between said upper surface and said bottom surface;
 a pair of wells positioned on said upper surface of said panel, each of said wells being positioned proximate a respective one of said straight outer sides of said perimeter edge wherein said wells are configured for receiving wheels coupled to a cooler positioned on said panel, each of said wells being defined by a respective rectangular wall extending upwardly from said upper surface of said panel;
 a strap having opposite ends coupled to said panel, said strap having an adjustable length, said strap being positionable to extends across said upper surface of said panel such that said strap is configured for securing the cooler on the panel, each of said opposite ends of said strap being coupled to said upper surface of said panel in linear alignment with an outer lateral side of a respective one of said walls, said strap having a break therein defining a first section and a second section of said strap; and
 a connector coupled to said strap, said connector releasably coupling said first section of said strap to said second section of said strap.

\* \* \* \* \*